UNITED STATES PATENT OFFICE.

JONAS W. AYLSWORTH, OF EAST ORANGE, NEW JERSEY, ASSIGNOR TO CONDENSITE COMPANY OF AMERICA, OF BLOOMFIELD, NEW JERSEY, A CORPORATION OF NEW JERSEY.

EXPANDED GRAPHITE.

1,191,383.                Specification of Letters Patent.      Patented July 18, 1916.

No Drawing. Original application filed May 29, 1913, Serial No. 770,689. Divided and this application filed December 4, 1914. Serial No. 875,431.

*To all whom it may concern:*

Be it known that I, JONAS W. AYLSWORTH, a citizen of the United States, residing at East Orange, in the county of Essex and State of New Jersey, have invented certain new and useful Improvements in Expanded Graphite, of which the following is a specification.

My invention relates to a novel form of graphite and to a process for making the same.

By my invention I change the physical condition of flake graphite, so that, after the treatment I give it, it is greatly expanded in volume, with all of the many small leaves or laminæ of which each flake is composed opened up and separated like the leaves of an open or partly open book, without, however, being completely detached from each other. This separation is apparently accompanied by the entrapping of gas or air between the laminæ of the expanded flakes, and results in a graphite of reduced specific gravity and greatly increased bulk or volume. This product may be effectively employed in a number of uses, among them as a lubricant, either alone or in combination with fluid lubricants, such as oils, glycerin and water, in which it will remain suspended or float on the surface thereof.

My present application is a division of my Patent No. 1,137,373, dated April 27, 1915, for improvements in expanded graphite and compositions thereof. In the said application, I have described and claimed compositions formed by compounding the expanded graphite which is described and claimed herein with a binder and if desired with other substances to form an improved composition suitable for molding in various forms. One of the uses of the expanded or "fluffy" graphite claimed herein is the employment of the same as an ingredient of moldable compositions suitable for the manufacture of valve disks, seats, packing, bearings, brushes for motors and other electrical apparatus, and other uses as described in the patent above referred to.

Flake graphite, as mentioned above, consists of foliated particles or flakes, each of which is composed of a large number, probably many hundreds, of microscopically thin laminæ superposed upon each other like the leaves of a closed book. The process of forming my expanded or "fluffy" graphite consists broadly in so treating the graphite that the laminæ comprising each particle or flake will be coated with a material of such a character that when subjected to heat the laminæ will be separated or opened up like the leaves of a book, without, however, being completely detached, and permitting the entrapping of air or gas between them. This process can be so adjusted that the degree to which the laminæ shall be opened up may be closely regulated, to permit desired specific gravities to be obtained.

In carrying out this process, the graphite may first be ground or otherwise reduced so that the particles thereof shall represent the approximate size desired, and it may then be screened or sized to obtain a fairly even product. The graphite must not, however, be reduced to extreme fineness, or to an impalpable powder, since if this is done the desired permanent expansion of the graphite will not be obtained. The graphite should not be reduced to particles so small as to pass through a 200-mesh screen, for example. I now subject the graphite particles to the action of a strong oxidizing agent, such as a mixture of concentrated sulfuric and nitric acids, or equivalent oxidizing solution. The graphite is heated with a sufficient amount of the oxidizing fluid to cover and thoroughly wet it to a soggy mass, at a temperature of from 60° C. to the boiling point of the acid used, temperatures of from 100° C. to 130° C. being effective. A suitable length of time for this part of the process is from one quarter hour to four hours, varying with the particular grade of graphite treated, the temperature of the oxidizing agents, and the amount of swelling desired in the final product. The graphite is then washed to remove the acids or salts and heated to approximately a red heat, or say from 350° to 600° C. until there has been sufficient expansion of the material. By this treatment the graphite swells enormously, so that its bulk is from ten to twenty-five times greater than before. Each individual flake has expanded, as may be seen under the microscope, some having opened like a booklet, and others more like an accordion or bellows, that is, the laminæ of the flakes still adhering together at one or more edges or points, the laminæ being seen under the microscope to be distorted or curved. The increase in bulk varies within the limits mentioned in accordance with the extent of oxidation or treatment, that is, the length of time and quantity of acid mixture, used in the treatment. The minute laminæ in opening up or separating, if the heating is done in the presence of air, will become coated with thin films of air which become mechanically entrapped within or between the folds and do not escape even if the graphite is immersed in a liquid, such as a fluid lubricant. If the heating is performed in a gaseous atmosphere, films of the gas, instead of air, will be mechanically entrapped between the folds of the particles. By suitably regulating the extent of the treatment by the oxidizing agent, or the oxidizing strength of the latter, the degree to which the increase in bulk of the particles takes place may be quite closely controlled, so that the treated material may be made suitable, if desired, for floating upon or remaining suspended within a desired oil or other fluid lubricant. The oxidizing process coats the laminæ of the graphite flakes with a substance which apparently is graphitic acid. As stated, enough of the oxidizing agent is used to thoroughly wet the graphite. I have found that the proportion of one part of the oxidizing agent to five parts of the graphite gives good results. If a mixture of nitric acid and sulfuric acid is used as the oxidizing agent, a ratio of three parts of sulfuric acid to one of nitric acid gives good results, and if nitric acid and chlorate of potash are used, four parts of the nitric acid may be used to one part of the chlorate. This part of the process is carried on only long enough to coat the laminæ with graphitic acid, and not long enough to convert any large portion of the graphite into graphitic acid. In the subsequent heating operation, the graphite swells, as stated, to many times its former volume, apparently because of the exploding or dissociating of the graphitic acid coating the laminæ, the laminæ being separated or opened up, but still being fastened together at the edges or corners, as is apparent from microscopic examination. The chemical process apparently, therefore, consists in the partial conversion of the graphite into graphitic acid, and the decomposition of the latter, by heating to a low red heat, to produce the altered physical state of the original graphite, as noted.

It has been previously proposed to purify natural graphite by first reducing it to a state of extremely fine subdivision, washing out the heavier impurities, heating with an oxidizing agent and afterward roasting it. The oxidizing step of this process apparently converted all, or practically all, of the extremely fine graphite powder to graphitic acid, and the roasting did not result in the formation of permanently expanded graphite in particles composed of attached laminæ in opened form. To the best of my knowledge, I am the first to practise the process described for the production of my improved product, and to record the effect thereof.

By way of example and illustration, my process may be carried out and my improved product formed as follows: 1000 parts of flake graphite by weight are heated for from ½ to 2 hours with 500 parts concentrated nitric acid or an equivalent weight of sodium nitrate and 700 parts of strong sulfuric acid, by weight, at a temperature of between 100° C. and 130° C. The product is washed, dried, and then heated in a suitable retort or vessel to a temperature of about 500° C. until the puffing up or swelling of the graphite is completed. Care should be taken to allow for sufficient room for the expansion of the graphite, which requires a space of up to about twenty-five times the original bulk, as previously stated. The washing after the first heating, described above, may be dispensed with, if desired, if the oxidizing fluid contains no salts, the acid being evaporated.

In the claims where a film of gas is referred to as entrapped between the laminæ, the word "gas" is to be understood as including air.

Having now described my invention, what I claim and desire to protect by Letters Patent is as follows:—

1. As a new composition of matter, an improved flake graphite in which the attached laminæ of which each flake is composed are opened up or partly separated, the composition being of greatly and permanently increased volume and decreased specific gravity in comparison with natural untreated flake graphite, substantially as set forth.

2. As a new composition of matter, an improved flake graphite in which the attached laminæ of which each flake is composed are permanently opened up or partly separated, with films of gas mechanically entrapped between the laminæ, substantially as set forth.

3. The process of treating flake graphite for the purpose described, which consists in thoroughly subjecting the particles thereof to the effect of an oxidizing agent such that on subsequent application of heat the particles will remain self-coherent and be greatly and permanently distended, and in then heating the particles so treated, substantially as set forth.

4. The process of treating flake graphite for the purpose described, which consists in converting by an oxidizing agent a part only of the graphite into graphitic acid in the form of films on the laminæ of the individual flakes of graphite, and in subsequently heating the flakes of graphite so treated to cause the graphitic acid to dissociate and the laminæ to separate but remain attached, with the consequent considerable permanent increase in bulk of the graphite, substantially as set forth.

5. The process of treating flake graphite for the purpose described, which consists in obtaining particles of a size too great to pass through a 200 mesh screen, then in thoroughly covering the particles with an oxidizing agent such that on application of heat the particles will be greatly distended, by the opening up of the laminæ thereof like the leaves of a partly opened book, and in then heating the particles so treated to redness, substantially as set forth.

This specification signed and witnessed this 3d day of December, 1914.

JONAS W. AYLSWORTH

Witnesses:
    DYER SMITH,
    I. MCINTOSH.